US012068469B2

(12) United States Patent
Gromadskyi

(10) Patent No.: US 12,068,469 B2
(45) Date of Patent: Aug. 20, 2024

(54) METHOD OF PRODUCING A SELF-SUPPORTED ELECTRODE FILM IN A WET PROCESS WITHOUT ORGANIC SOLVENT

(71) Applicant: BLUE WORLD TECHNOLOGIES HOLDING APS, Aalborg Oest (DK)

(72) Inventor: Denys Gromadskyi, Ellidshoj (DK)

(73) Assignee: BLUE WORLD TECHNOLOGIES HOLDING APS, Aalborg Oest (DK)

( * ) Notice: Subject to any disclaimer, the term of this patent is extended or adjusted under 35 U.S.C. 154(b) by 0 days.

(21) Appl. No.: 18/252,943

(22) PCT Filed: Nov. 12, 2021

(86) PCT No.: PCT/DK2021/050330
§ 371 (c)(1),
(2) Date: May 15, 2023

(87) PCT Pub. No.: WO2022/105973
PCT Pub. Date: May 27, 2022

(65) Prior Publication Data
US 2024/0079545 A1    Mar. 7, 2024

(30) Foreign Application Priority Data
Nov. 18, 2020  (DK) ............... PA 2020 01297

(51) Int. Cl.
*H01M 4/04*   (2006.01)
*H01M 4/62*   (2006.01)
(52) U.S. Cl.
CPC ....... *H01M 4/0404* (2013.01); *H01M 4/0411* (2013.01); *H01M 4/0416* (2013.01);
(Continued)

(58) Field of Classification Search
CPC ............ H01M 4/0404; H01M 4/0411; H01M 4/0416; H01M 4/0435; H01M 4/0471; H01M 4/623
See application file for complete search history.

(56) References Cited

U.S. PATENT DOCUMENTS

| 4,501,446 A | 2/1985 | Glaser et al. |
| 4,931,190 A | 6/1990 | Laros |

(Continued)

FOREIGN PATENT DOCUMENTS

| EP | 7798333 A1 | 2/1995 |
| EP | 2871697 A1 | 5/2015 |

OTHER PUBLICATIONS

Gogotsi Y. et al.; ACS Nano, 13 (2019) 8491.
(Continued)

*Primary Examiner* — Matthew T Martin
*Assistant Examiner* — Grace Ann Kenlaw
(74) *Attorney, Agent, or Firm* — Brooks Kushman P. C.; John E. Nemazi

(57) ABSTRACT

For production of electrodes in batteries, capacitors, their hybrids, as well as fuel cells or electrolyzers, a self-supported electrode film is produced by providing an aqueous dispersion of a powder mix of active material and binder polymer, drying and kneading the powder mix into a malleable substance and forming it into an electrode film by calendering. The process is useful for low-cost, large-scale production and is environ-mentally friendly, as no organic solvent is used.

15 Claims, 3 Drawing Sheets

(52) U.S. Cl.
CPC ....... *H01M 4/0435* (2013.01); *H01M 4/0471* (2013.01); *H01M 4/623* (2013.01)

(56) References Cited

U.S. PATENT DOCUMENTS

| | | | |
|---|---|---|---|
| 6,127,474 | A | 10/2000 | Andelman |
| 7,295,423 | B1 | 11/2007 | Mitchell et al. |
| 10,601,027 | B2 | 3/2020 | Du et al. |
| 10,707,492 | B2 | 7/2020 | Amin-Sanayei et al. |
| 2004/0086774 | A1 | 5/2004 | Munoz et al. |
| 2008/0233273 | A1 | 9/2008 | Aubert et al. |
| 2011/0171526 | A1 | 7/2011 | Wakizaka et al. |
| 2011/0204284 | A1 | 8/2011 | Duncan et al. |
| 2012/0107689 | A1 | 5/2012 | Takahashi et al. |
| 2013/0300019 | A1* | 11/2013 | Tarasov ............. H01G 11/86 264/105 |
| 2014/0017570 | A1* | 1/2014 | Naoi ............. H01M 4/133 252/506 |
| 2014/0030590 | A1 | 1/2014 | Wang et al. |
| 2014/0255782 | A1 | 9/2014 | Jabbour et al. |
| 2015/0251109 | A1 | 9/2015 | Enokihara |
| 2017/0098818 | A1 | 4/2017 | Cheng et al. |
| 2018/0083260 | A1 | 3/2018 | Jiang et al. |
| 2022/0029166 | A1* | 1/2022 | Hippauf ............ H01M 4/1391 |

OTHER PUBLICATIONS

Li W. et al.; Chemical properties, structural properties, and energy storage applications of Prussian blue analogues; Small (2019) 1900470.
Calleja G. et al.; Where is the glass transition temperature of poly(tetrafluoroethylene)? A new approach by dynamic rheometry and mechanical tests; European Polymer Journal, 49 (2013) 2214.
Phillips O. et al.; Thermal decomposition of poly(propylene carbonate): End-capping, additives, and solvent effects; Polymer Degradation and Stability, 125 (2016) 129.
AGC; Fluon ETFE; http://dictkr.com/down/Fluon%20ETFE%20Technical%20Bulletin.pdf; (2006).
Gromadskyi D. et al.; Bivariant mechanical tuning of porous carbon electrodes for high-power and high-energy supercapacitors; Surface Engineering and Applied Electrochemistry, 52 (2016) 584.
Badwal S. et al.; Emerging electrochemical energy conversion and storage technologies; Frontiers in Chemistry, 2 (2014) 1.
Stevenson A. et al.; Supercapatteries with hybrids of redox active polymers and nanostructured carbons; Nanocarbons for Advanced Energy Storage, 6 (2015) 179.
Gromadskyi D.; Hydrothermal express synthesis of CNT/MnO2 composite for asymmetric supercapacitor; Surface Engineering and Applied Electrochemistry, 52 (2016) 289.
Colon-Mercado H. et al.; Journal of Power Sources, 155 (2006) 53.
Chen Z. et al.; A review on non-precious metal electrocatalysts for PEM fuel cells; Energy and Environmental Science, 4 (2011) 3167.
Gromadskyi D. et al.; Cyclic voltametric study of tin hexacyanoferrate for aqueous battery applications; Journal of Electrochemical Science and Engineering, 6 (2016) 225.
Buqa H. et al.; Study of styrene butadiene rubber and sodium methyl cellulose as binder for negative electrodes in lithium ion batteries; Journal of Power Sources, 161 (2006) 617.
Wang F. et al.; Effects on the electrode wettability on the deep discharge capacity of Li—O2 batteries; ACS Omega, 3 (2018) 6006.
Ludwig B. et al.; Solvent free manufacturing of electrodes for lithium-ion batteries; Scientific Reports, 6 (2016) 23150.
Lee W. et al.; Improvement of fuel cell performances through the enhanced dispersion of the PTFE binder in electrodes for use in high temperature polymer electrolyte membrane fuel cells; International Journal of Hydrogen Energy; In press (2020).
Toigo C. et al.; Study of different water-based binders for Li4Ti5O12 electrodes; Molecules, 25 (2020) 2443.
Spreafico M. et al.; PVDF latex as a binder for positive electrodes in lithium ion batteries; Industrial and Engineering Chemistry Research, 53 (2014) 9094.
Solvey; Solef; https://www.nevicolor.it/prodotti/ricerca-polimero/solvay/solef-pvdf/documenti/solef-pvdf-aqueous-dispersions-for-lithium-batteries-en.pdf; (2015).
Sigma-Aldrich; PTFE aqueous dispersion; https://www.sigmaaldrich.com/catalog/product/aldrich/665800?lang=en&region=DK&gclid=Cj0KCQjw8rT8BRCbARIsALWiOvTf-NXa1Z9BZOO0tusViAt7c7PwlFrfSE8UxVfGOls61JsJKzeedkAaAsDwEALw_wcB; downloaded 2020.
Laurel; Ultraflon; http://laurelproducts.com/ptfe-aqueous-dispersion/; downloaded 2020.
Teflon, PTFE Aqueous dispersions; https://www.teflon.com/en/products/dispersions; downloaded 2020.
CHEMWATCH; Gujarat PTFE aqueous dispersion; https://www.inoflon.com/pdf/Aq%20PTFE_MSDS.pdf; downloaded 2020.
IMCD; PTFE dispersions; https://www.imcdus.com/ptfe-dispersions/; downloaded 2020.
FLUOROGISTX; Teflon and Zonyl aqueous dispersion; https://fluorogistx.com/products/teflon-dispersion-ptfe/; downloaded 2020.
MATWEB; Chemours PTFE Aqueous Dispersion, http://www.matweb.com/search/datasheettext.aspx?matguid=f69b869c16494004b96c827e0d736590; downloaded 2020.
China Fluoropolymer; PTFE Aqueous Dispersion; https://www.chinafluoropolymer.com/ptfe/ptfe-aqueous-dispersion/ptfe-aqueous-dispersion-coating.html; downloaded 2020.
Dupont; PTFE Aqueous Dispersion; http://download.ceris.purdue.edu/file/3187; (2012).
Guaniflon; Tenfil 400; https://www.guarniflon.com/en/ptfe-standard-compound-menu-en/60-english/guarniflon-s-p-a-en/products/tenfil-en; downloaded 2020.
Bainaisi; PTFE Aqueous Dispersion; http://www.bainaisi.com/en/item/?id=164; downloaded 2020.
Haiflon; PTFE aqueous dispersion; http://www.haiflon.com/ptfe-aqueous-dispersion; downloaded 2020.
Shamrock Technologies; Aquaflon 60; https://shamrocktechnologies.com/product/aquaflon-60/; downloaded 2020.
Ashraf M. et al.: Effects of size ang aggregation/agglomeration of nanoparticles on the interfacial/interphase properties and tensile strength of polymer nanocomposites; Nanoscale Research Letters, 13 (2018) 214.
Zare Y. Study of nanoparticles aggregation/agglomeration in polymer particulate nanocomposites by mechanical properties; Composites A, 84 (2016) 158.
Hartley P. et al.: The role of the van der Waals force in the agglomeration of powders containing submicron particles; Powder Technology, 42, 1985, 35.
Substech; ECTFE; https://www.substech.com/dokuwiki/doku.php?id=ethylene_chlorotrifluoroethylene_ectfe; (2013).
Matweb; Solvey Halar® 350LC ECTFE; http://www.matweb.com/search/datasheet_print.aspx?matguid=65edaac69a994a9d8b1ec1aeace0acdf ; downloaded 2023.
AGC; Fluon LM-ETFE; https://www.agc-chemicals.com/file.jsp?id=cn/en/fluorine/products/fluon/download/pdf/FluonLM-ETFE_ENG.pdf; downloaded 2020.
Substech; ETFE; https://www.substech.com/dokuwiki/doku.php?id=ethylene_tetrafluoroethylene_etfe; (2013).
Texloc; FEP properties; http://www.row-inc.com/pdf/FEP_Property_Chart.pdf; (2002).
Zeus; FEP polymer; https://www.zeusinc.com/wp-content/uploads/2020/06/FEP-Material-V2R2.pdf; downloaded 2020.
Greer A. et al.; Fluorinated ethylene-propylene: a complimentary alternative to PDMS for nanoimprint steps; Nanotechnology, 27 (2016) 155301.
Sterling Plastics ; PCTFE; http://sterlingplasticsinc.com/materials/pctfe-polychlorotrifluoroethylene/; (2012).
Polymer Databsase; PCTFE; https://polymerdatabase.com/polymers/Polychlorotrifluoroethylene.html; (2015-2021).
Zulficar S. et al.; Polymer degradation and stability, 43 (1994) 423.
SWM; PCTFE; https://www.swmintl.com/media/2342/pctfe-spec-sheet-6 3005-new.pdf; downloaded 2020.

(56) References Cited

OTHER PUBLICATIONS

Dupont; PTFE handbook; http://hep.ucsb.edu/LZ/ptfe_handbook.pdf; downloaded 2020.
Matweb; PTFE Mica Filled; http://www.matweb.com/search/datasheet_print.aspx?matguid=ef394c1e30c54ca8b21836006aee2484; downloaded 2023.
Hondred P. et al.; Degradation kinetics of polytetrafluoroethylene and poly(ethylene-alt-tetrafluoroethylene); High Performance Polymers, 25 (2013) 535.
Tobolsky A. et al.; Rheology of polytetrafluoroethylene; Journal of Polymer Science A, 1, 1963, 483.
International Search report for PCT/DK2021/050330, prepared by the Nordic Patent Institute mailing date Jan. 27, 2022, 3 pages.

* cited by examiner

METHOD OF PRODUCING A SELF-SUPPORTED ELECTRODE FILM IN A WET PROCESS WITHOUT ORGANIC SOLVENT

CROSS-REFERENCE TO RELATED APPLICATION

This application is the U.S. national phase of PCT Application No. PCT/DK2021/050330 filed on Nov. 12, 2021, which claims priority to DK Patent Application No. PA 2020 01297 filed on Nov. 18, 2020, the disclosures of which are incorporated in their entirety by reference herein.

FIELD OF THE INVENTION

The present invention relates to a method of production of a self-supported electrode film for electrochemical energy conversion and storage systems, where the process does not use organic solvents.

BACKGROUND OF THE INVENTION

One of the main components in devices for conversion and storage of electrochemical energy is the electrode, where electrochemical reactions and/or electrical double-layer formation, due to electrostatic forces, occur. Batteries, electrical double-layer capacitors, electrolyzers as well as fuel cell electrodes comprise active material and a binding agent for the active material [Ref. 1].

For example, active materials for such devices include various carbon modifications, transition metal oxides, noble metals, and electro-conducting polymers [Ref. 2-6]. Normally, useful binding additives are polymers that are chemically/electrochemically inert and thermostable at operating temperature ranges. Depending on the type of battery or electrical double-layer capacitor, such polymers vary from relatively inert polymers, for example fluor-containing polymers, such as polytetrafluoroethylene (PTFE) and polyvinylidene difluoride (PVDF), to water-soluble ones, like styrene-butadiene rubber (SBR) and carboxymethyl cellulose (CMC). Water-soluble polymers are only useful for devices operating with non-aqueous electrolyte solutions [Ref. 7-8].

Typically, PVDF is used in large-scale electrode production because it forms stable inks in mixture with active materials after dissolving in some organic solvents having high boiling temperature, e.g. N-methyl-2-pyrollidone (NMP), N,N-dimethyl acetamide (DMAc), N,N-dimethyl formamide (DMF) or dimethyl sulfoxide (DMSO). Especially, PVDF-based inks have good adhesion to metal substrates and low risk of agglomeration, and they are non-flammable in contrast with PTFE based inks which are mainly dispersed in alcohols having low flash points [Ref. 9, 10]. Disadvantageously for PVDF, long-term drying procedures must be applied for removing the solvent from the electrodes after their coating [Ref. 9]. Even more unfortunately, utilization of such solvents is normally limited by regulation due to their toxicity. It also means that installation of costly systems for trapping their vapors is needed.

Some researchers propose using aqueous dispersions of PVDF, containing some quantities of adhesive promoters and plasticizers, which is mainly the same fluid used for dissolving the polymer. Unfortunately, as already mentioned, NMP as well as other suitable solvents, like N,N-dimethylformamide (DMF), N,N-dimethylacetamide (DMAc), and dimethyl sulfoxide (DMSO), are toxic, as also emphasized in the disclosure of U.S. Ser. No. 10/707,492B2 [Ref. 11].

EP2871697 [Ref. 63] discloses a production process for fuel cell electrodes in which at least 20% wt. of PTFE is mixed with at least 35% wt. of carbon black and graphite, and where the dried powder mass is mixed with a hydrocarbon solvent as extrusion aid and paste extruded, calender-rolled, heated for two hours at 180° C. and heated further at higher temperature under stretching, where the temperature, for example 250° C., is lower than the melting point of 320° C. of the PTFE that is used in the process. Finally, the sheet is sintered at even higher temperature to finalize the molding process, which is exemplified with a temperature of 350° C., above the melting temperature of the used PTFE. In a disclosed comparative Example 2, a PTFE content of 18 wt. % did not result in a useful sheet, so that a minimum content of PTFE was set to 20 wt. %. EP2871697 [Ref. 63] discloses further evaporation of the extrusion aid for creating voids in the sheet. However, in order to provide voids having a sufficient size, the amount of the organic extrusion aid should be higher than for a usual production.

Disadvantageously, this process in EP2871697 [Ref. 63] uses organic solvents, which is not good for environmental reasons and also increases costs. Furthermore, the fact of a long heating process at 180° C. for two hours makes this process slow and not suitable for a fast, large scale production at low cost. Additionally, the molding process at a temperature higher than the melting temperature of PTFE is disadvantageous in that the sheet would tend to stick to the support and mold, which is unsuitable for a fast and smooth production process. Accordingly, the process in EP2871697 [Ref. 63] is not suitable for a fast, large scale, low cost, environmentally friendly production of electrodes.

EP2871697 [Ref. 63] discloses a process for making PTFE powder from a latex, using organic solvents. However, aqueous dispersions of PTFE are meanwhile commercially available from different suppliers [Ref. 15-27].

In order to reduce the amount of solvents in production processes, U.S. Ser. No. 10/601,027 [Ref. 62] proposes a wet forming process for electrodes deposited onto current collectors. The process is described as having a low solvent content, for example a water/IPA mix within the range of 90:10 and 80:20.

Only few publications [Ref. 12, 13] describe processes for coating electrodes using water-based inks that contain PVDF and without organic solvent additives. Correspondingly, there are still only few commercial products on the market [Ref. 14] where electrodes are produced by using a PVDF binder dispersed in water.

Production of a carbon electrode without use of solvents, where PTFE is used as a binder, is disclosed in US2011204284 A1 [Ref 64]. Water is removed from the material by vacuum drying. US2013300019A1 [Ref. 65] discloses a manufacturing method for polarizable electrode plates in an electrochemical capacitor, wherein the electrodes plates are shaped by rolling in dry form after removal of water. U.S. Pat. No. 6,127,474 [Ref. 66] discloses a fluorocarbon binder material for an electrode composition, which is shaped by extrusion.

US2014255782A1 [Ref. 67] discloses a method for preparing self-supporting flexible electrodes, where cellulose fibers are used as binder. US2015251109A1 [Ref 68] discloses a method for removing bubbles from an electrode paste by vacuum. US2011171526A1 [Ref 69] discloses a slurry for electrodes from and a method for removing metal particles from the polymer dispersion.

Relatively new is a manufacturing process utilizing powdered materials without any solvents in a so-called "Dry" process, as disclosed in U.S. Pat. No. 7,295,423B1 [Ref. 28] and patent application US 2017/0098818 [Ref. 29]. In such processes, electrodes are formed by intensive mixing of dry powders of activated carbon and fluoropolymer, including fibrillization of PTFE, and further calendering of the mix into a self-supporting film [Ref. 28] or electrospray deposition onto a metal substrate [Ref. 29]. This latter reference emphasizes that state-of-the-art slurry mixing and coating processes are recognized as slow, high cost, low quality steps in battery manufacturing, which is in agreement with the above discussion and which is why this disclosure US 2017/0098818 [Ref. 29] favors dry powder coating.

On the other hand, also dry processes have disadvantages. For example, it is well-known that fine powders have a high tendency for aggregation/agglomeration, which leads to poor mechanical properties of the resulting composite materials [Ref. 30, 31]. Moisture residuals may form liquid "bridges" between single particles, which bonds them into the bigger clusters [Ref. 32]. Accordingly, such processes require extremely dry gaseous atmospheres during mixing processes of the powdered materials (ex. the dew point is −40° C./12 ppm) [Ref. 28].

US2014/0030590A1 [Ref. 33] discloses another variation of a dry process, in which a powder mixture containing graphene nanosheets is formed into self-supporting electrodes by means of thermoplastic binders, such as styrene-butadiene rubber (SBR), Carboxymethyl Cellulose (CMC) and polyacrylic acid (PAA). Optionally, calendering is used for forming the film. It should be mentioned that the process is limited to the use of graphene as active material. Furthermore, these binders are water soluble or swelling therein, which limits the choice of electrolyte solutions for electrochemical energy conversion and storage devices.

It appears that the prior art largely differentiates between dry processes, in which self-supporting electrode layers are produced, and wet processes, where a paste or spray is cast onto a supporting substrate. Wet processes for self-supporting electrodes appear not to have been recognized as feasible and/or advantageous for industrial production.

In particular, in contrast to the advantages recognized in the prior art for dry processes, as already outlined above, in the prior art, wet processes are regarded as slow, high cost, low quality steps in battery manufacturing, see in particular US 2017/0098818 [Ref. 29], which appears to make them unsuitable for industrial mass production at competitive prices. This is supported by the disclosure of the above-mentioned EP2871697, in which a two hour long drying process is used and where the use of organic solvents increases the costs.

Taking into regard the steady pressure in the field for improvements in performance of batteries and capacitors, large efforts are put into improvements of these components as well in improvements of production techniques for providing industrial products at low costs, which is of utmost importance in order for a product to be successful on a growing competitive market.

Accordingly, despite the recent advantages in the technical field of batteries and capacitors for storage of electricity, there is still a substantial need for improvements.

DESCRIPTION/SUMMARY OF THE INVENTION

It is an objective of the invention to provide an improvement in the art. In particular, it is an objective to provide improved electrodes for devices that convert or store electrochemical energy, for example batteries, electrical double-layer capacitors, electrolyzers, and fuel cells. A particular objective is to provide an improved method of production of electrodes, which is suitable for large-scale industrial production at relatively low cost and which is environmentally friendly.

This is achieved with a method for production as described in the claims and in the following as well as with a self-supported film sheet produced by such method without the use of organic solvents.

In general terms for the described method, for providing an electrode film for an electrode, active material for the electrode is provided as a powder and mixed with other powders in an aqueous dispersion. In particular, alongside the active material, a powder of a polymeric binder, for example PTFE, is added for finally binding the active material in a polymer matrix. Potentially other additives are added as powder, for example electroconductive material for providing the electrode with the appropriate degree of electroconductivity, pore-formers for providing porosity in the electrode material, and/or additives that increase the mechanical strength of the electrode, for example fibers. The powder mix is dewatered, dried, kneaded into a malleable substance and formed into an electrode film by calendering prior to cooling. The method is useful for low-cost, large-scale production of electrodes for various devices, including batteries, capacitors, particularly supercapacitors and including double-layer capacitors, supercapatteries, super-cabatteries (hybrids of batteries and supercapacitors), fuel cells, or electrolyzers.

The term "self-supported" or "free-standing" in the current context implies that the film is supported by itself without the need of a supporting substrate and is able to maintain its shape. This is in contrast to some of the prior art, in which a wet forming process for electrodes is described as a procedure where an electrode film is provided by applying an electro-conductive paste to an electroconductive substrate, such as a metal substrate, which functions as a current collector, see the aforementioned U.S. Ser. No. 10/601,027 [Ref. 62] and U.S. Pat. No. 7,295,423B1 [Ref. 28], if not sprayed onto such substrate, as in US 2017/0098818 [Ref. 29].

The term "active material" is used herein, as commonly used in the technical field. Nevertheless, it is appropriate to add some comments at this point concerning this term. Primarily, the active material is the material that is essential in the electrode for achieving the electrochemical and/or electrostatic process of the mentioned device. In contrast thereto, the binder material is not actively involved in the electrochemical and/or electrostatic process of the device. However, it is pointed out that the active material for electrodes in a battery can be very different from the active material in capacitors. For example, in some devices, the active material itself is electroconductive, in others, the active material is not electroconductive or not sufficiently electroconductive, and an electroconductive material has to be added in order for the electrode to become electroconductive.

The various processes in the production method are explained in detail in the following. Advantageously, the method is automatic with a number of processes performed in an automated sequence.

The method, as described, is free from organic solvents and thus environmentally friendly. By using water in the process, instead of a dry process, a number of advantages are achieved, which will also be disclosed in greater detail below. The method is explained in greater detail in the following.

In a mixing process, an aqueous dispersion of a powder mix is provided. The powder mix comprises a first powder of a binder material, sometimes also simply called "binder" in the technical field, and a second powder of an active material.

The binder material in this process is playing a key role. Special requirements are addressed to the binder material, in particular that it should be thermoplastic polymer with high ability to elongation. Apart from these requirements, other typical necessary requirements are generally the same as for all binder materials utilized in electrochemical energy conversion and storage devices and they have been already mentioned in the introduction. However, not many polymers fulfil these strict requirements.

For example, the binder polymer is a fluoropolymer with fibrilization capabilities, a glass transition temperature of at least 80° C., a melting point above 200° ° C., and an elongation at break of at least 150%.

Table 1 states mechanical and thermal properties of some promising candidates, see also [Ref. 34-48].

polyaniline, polyindole, polypyrrole, polythiophene), silicon, sulfur, noble metals (e.g. Pt, Pd, Ru, Ir, Rh, Os, Ag, Au), alkali metal-doped or undoped metal oxides, oxyhydroxides, hydroxides, phosphates (e.g. $MnO_2$, $Mn_3O_4$, $MoO_3$, $WO_3$, $Fe_3O_4$, $V_2O_5$, $RuO_2$, $SnO$, $SnO_2$, $PbO_2$, $Co_3O_4$, $NiOOH$, $MnCo_2O_4$, $LiFePO_4$, $LiNiPO_4$, $LiMnPO_4$, $LiCoPO_4$, $LiCrPO_4$, $LiVPO_4$, $LiFe_xMn_yPO_4$, $LiTiO_2$, $Li_4TisO_{12}$, $LiCo_2$, $LiMnO_2$, $LiMn_2O_2$, $LiNiO_2$, $LiAlMnO_4$, $LiMn_xNi_yO_m$, $LiNi_xCo_yMn_zO_m$, $LiNi_xCo_yO_m$, $LiNi_xCo_yAl_zO_m$, $LiNi_xCo$, $Ti_zO_m$, $LiNi_xCo$, $In_2O_m$, $LiNi_xCo_yMg_yO_m$, $LiNi_xCo_ySn_zO_m$, $LiNi_xCo_yGa_zO_m$, $NaTiO_2$, $Na_2Ti_3O_7$, $Na_3V_2(PO_4)_3$, $Na_2V_2(PO_4)_2F_3$, $NaN_xMn_yO_m$, $NaFe_xMn_yO_m$, where x+y+z=1, while m is a integer representing the number of oxygen atoms in the oxide to realize electron-balanced molecule), chalcogenides (e.g. $CoS_2$, $MnS_2$, $NiS_2$, $FeS_2$, $MoS_2$), nitrides, carbides, borides (so-called MXenes in Ref. 51), hexacyanoferrates (so-called Prussian blue analogues in Ref 52), as well as carbon modifications (e.g. graphene, graphite, activated carbons, amorphous carbons, carbon blacks, carbon nanotubes, carbon fibers).

The final electrode material should be electroconductive. If the active material is not electroconductive, an electro-

TABLE 1

Physical, mechanical and thermal specifications of some thermoplastic fluoropolymers

| | Polymer | | | | |
|---|---|---|---|---|---|
| Specification | Ethylene chlorotrifluoroethylene (ECTFE) | Ethylene tetrafluoroethylene (ETFE) | Fluorinated ethylene propylene (FEP) | Polychlorotrifluoroethylene (PCTFE) | Polytetrafluoroethylene (PTFE) |
| Glass transition temperature (° C.) | 85 | 80 | 80 | 87 | 110 |
| Melting point (° C.) | 242 | 265 | 260 | 212 | 327 |
| Decomposition temperature (° C.) | 405 | 390 | 450 | 300 | 450 |
| Elongation at break (%) | 250 | 300 | 330 | 150 | 400 |
| Modulus of elasticity [GPa] | 1.65 | 0.80 | 0.34 | 1.20 | 2.07 |
| Density [g/cm$^3$] | 1.68 | 1.74 | 2.15 | 2.13 | 2.16 |

From Table 1, it is observed that PTFE has some beneficial properties, such as the highest elongation at break and modulus of elasticity as well as excellent thermal stability.

Furthermore, it is pointed out that it is advantageous if the binder has fibrilization capabilities, as this has turned out to result in good mechanical stability. In particular, PTFE has good fibrilization capabilities.

However, as PTFE is an inert material, it reduces the electrochemical activity of electrodes. Therefore, its concentration should be as low as possible, such as in batteries, electric double-layer capacitors as well as their hybrids. On the other hand, the concentration must be high enough for providing a matrix for the active material and for obtaining a malleable substance for further calendering this structure into an electrode film, as will become more apparent when going into details of the production process. On the basis of these considerations and based on experiments, a realistic lower limit of 0.1 wt. % has been found. However, a concentration of the binder polymer, optionally PTFE, of at least 0.5 wt. % has proven to be easier and more reliable to handle during the production.

As mentioned, the powder mix also comprises a second powder of an active material. The selection of the active material depends on the type of electrode, such as anode or cathode, or electrode for a battery, electric double-layer capacitor, fuel cell or electrolyzer.

Candidates for active materials alone or in combination includes electroconductive polymers (e.g. polyacetylene, conductive filler material is potentially added to the mix as a powder and also dispersed in the mix in the aqueous dispersion. Alternatively, the binder polymer is electroconductive.

The dispersion is provided with 0.1-30 wt. % of the first powder and 1-99.9 wt. % of the second powder. Obviously, the sum is equal to or less than 100 wt. %.

All weight percentages herein are measured relatively to the dry material in the dispersion, unless explicitly defined otherwise herein.

If a minimum concentration of the binder is considered to be 0.1 wt. %, which has been found experimentally as possible for PTFE, it implies a maximum concentration of the active material of 99.9 wt. %. However, the latter is only possible if no powders of additives are used in the powder mix. When others additives are used, in order to obtain specifically properties, like higher electrical conductivity, redox activity and/or tension strength, the amount of active material is, typically, in the range of 1-80 wt. %, but more often 10-50 wt. % or even 30-40 wt. %.

The aqueous dispersion contains an aqueous liquid, for example water. However, although the aqueous liquid is based on water as the main component, the aqueous liquid may also contain small amounts of surfactants, dissolved salts, or other additives that are beneficial for the process.

For this reason, also, the term dispersion is used, instead of the term suspension, as the term dispersion includes suspended particles (suspension) as well as potentially immiscible additives (emulsion) in the dispersion, which are not in powder form.

After providing the dispersion with the powder of the active material and the binder, and potentially one or more additives in powder form, a separation process is used for separating the powder mix from most of the aqueous liquid in the dispersion. The separation process is a mechanical dewatering process for obtaining a water-reduced slurry of the powder mix. For example, the mechanical dewatering process comprises use of sieves having pores that retain the powder but let liquid from the dispersion flow through the pores. Optionally, the sieves are stationary. However, in a continuous process, it can be useful to use a dewatering station with running belts of a fine-porous material in between which the slurry is pressed.

After the separation process with the mechanical dewatering, a kneading process is used, in which the slurry is kneaded in a kneader at elevated temperature. However, before proper fibrillization can be achieved by a kneading process, the remaining water (or aqueous liquid) has to be removed from the mix. This can be done before the mix enters a kneader, or it can be done while the kneading in a kneader already takes place.

In order to evaporate remaining water in the sludge before substantial fibrillization of the binder takes place, the mix is heated to elevated temperature above the boiling point of water, such as 100° C. if at atmospheric pressure, although, it may have to be slightly offset thereof in dependence of other liquid components, for example surfactants, or dissolved salts in the aqueous liquid. If there is a risk for oxidation of active material when the slurry is dried, inert gas (e.g. nitrogen, argon) saturated atmosphere can be applied.

During the evaporation process, the mix is advantageously stirred or kneaded in order to increase the speed for evaporation. Alternatively, or in addition, vacuum drying may be used for this purpose as well.

In order for achieving fibrillization by the kneading, after evaporation of the liquid, the elevated temperature is kept above the glass transition temperature of the binder material, but below the melting point of the binder material. By the kneading at this elevated temperature, the slurry is transformed into a malleable substance, which in texture is similar to the dough of a bread. In order to provide a sufficient degree of fibrillization, the kneading of the malleable substance is continued until sufficient fibrillization of the binder material is caused by the kneading. The fibrillization of the binder material, for example PTFE, should be to a degree that improves the mechanical properties of the material to a predetermined level. A typical time for the kneading at this stage after evaporation of the aqueous liquid is 1-15 minutes, typically 3-10 minutes.

In order to determine an appropriate kneading time, test-trials can be made prior to the production process. For example, the test-trial comprises measuring, as a function of kneading time and kneading temperature, one or more physical properties of the electrode film and then adjusting the temperature and kneading in the kneading stage for a continuous production process on the basis of the test-trial for obtaining a level of the physical property above a predetermined level. Examples of desired improved physical properties may be tensile strength or elongation at break of the electrode film exceeding zero value as basepoint for raw active materials in powdered form. For instance, an electrode film containing 0.5 wt. % PTFE and 99.5 wt. % activated carbon demonstrates tensile strength ca. 0.2 MPa and 10%-elongation before its breaking.

Once, the test trial has been made and an appropriate kneading time and temperature has been found, the parameters for the kneading stage in the continuous production process are correspondingly adjusted on the basis of the test-trial. This way, physical properties for the electrode can be achieved above a predetermined level, for example a mechanical strength above a corresponding predetermined level.

After the kneading process, the malleable substance is extruded in an extrusion process. For example, the kneader comprises an extruder or is mechanically connected to an extruder. After extrusion, the mix is shaped in a calendering process. Optionally, the malleable substance is extruded onto a conveyor that transports it to a calendering station for further shaping. In such calendering process, the extruded malleable substance is rolled by calendering rollers for becoming formed into a film with a predetermined thickness, typically in the range of 10-1000 μm.

After the calendering process, the film is cooled down to below the glass transition temperature of the binder, which results in a structural stabilization of the film.

For example, the times for the process are adjusted as follows,
mixing time for the mixing process in the range of 1-5 minutes,
evaporation time for the evaporation process in the range of 10-25 minutes,
kneading time for the kneading process after evaporation of 1-15 minutes,
calendering time of 2-5 minutes,
cooling time after the kneading process in the range of 5-10 minutes.

For example, the total time for the continuous production in the range of 20-60 minutes. Such time ranges are attractive for quick and large-scale production.

For a continuous production process, it is useful if the electrode film is provided as a quasi-endless strip, optionally rolled into or onto a roll for storage and/or transport. The strip can then later be unrolled from and cut into pieces for further finalizing in the device.

In other embodiments, the produced electrode film is not rolled but cut into pieces, for example for storage and/or transport or for further preparation of electrodes as part of the continuous process.

Optionally, a current collector is attached to the conductive electrode for transport of electrical current to and from the electrode. If the electrode sheet is rolled as a strip, this current collector is optionally mounted to the strip prior to rolling of the strip or after unrolling of the strip. For example, the strip is unrolled and cut, and the current collectors mounted after cutting. Alternatively, the electrode film is not rolled but cut into pieces, which are combined with current collectors as part of the continuous process. Such pieces can be easily stacked for storage.

The described electrode film is then used for producing electrodes.

Optionally, in order to develop a predetermined degree of porosity of the final electrodes, a powder of a pore-forming agent from a pore-former container is added to the dispersion. A useful pore-forming agent is a sacrificial polymer which during the late stage in the production is heated above its decomposition temperature, causing its complete decomposition into gaseous products, leaving voids in the materiel. The concentration and grain size of the powder of the sacrificial polymer is adjusted for the desired concentration of pores in the end product as well as the size of the voids. Typically, the pore-forming agent is added in quantities in the range of 0-50 wt. %, but normally 10-20 wt. %.

The pore-forming agent should be selected among sacrificial polymers that decompose into gaseous products at a decomposition temperature above the boiling point of water in order for the water to evaporate first at a first temperature below the decomposition temperature, and then, only after drying of the mix, decomposing the pore forming agent at a second temperature, which is higher than the first temperature. The decomposition temperature should also be higher than the glass transition temperature of the binder material in order for the slurry being formed into a malleable substance before the pore-forming agent is decomposed and removed in order to leave voids in the electrode film and achieve a porous electrode in the end. Further, the decomposition temperature should be below the melting temperature of the binder material, as the melting of the binder would destroy the fibrillization thereof, which is unwanted. Also, the melting would decrease the viscosity and result in collapse of the voids, which is also unwanted. Besides, reaching the melting point of the binder may lead to sticking of the electrode film to the surface of roller and/or conveyor belt, which is disadvantageous and unwanted. Thus, the selection of a combination of a potential binder material and a potential pore-forming agent should be done carefully by taking into regard the decomposition temperature of the sacrificial polymer relatively to the glass transition temperature and melting point of the binder material.

Accordingly, in a pore-forming process as part of the continuous automated sequence of processes, the electrode film is raised to a temperature to or above the decomposition temperature for providing pores in the electrode film. However, this is done only after the calendering process, as otherwise the pores are destroyed by the calendering process.

As mentioned, the electrode could be used for batteries, capacitors, particularly supercapacitors, supercapatteries, supercabatteries (hybrids of batteries and supercapacitors), as well as fuel cells and electrolyzers.

Some remarks are given in the following with respect to the different type of devices.

For electric-double layer capacitor (supercapacitor), nano-porous materials are needed for the electrodes with high specific surface area and good electroconductive properties. Useful candidates for active electrode materials are carbon blacks, carbon nanotubes, and also activated carbons. Normally, the concentration of the carbon is above 80 wt. %, for example above 90 wt. %. As the carbon is electroconductive enough, no electroconductive additive is needed. However, for porosity, mechanical stability and potentially further adjustment of electroconductivity, additives can be provided, for example carbon fibers, nanotubes, graphite, and amorphous carbons. The content of additives is typically less than 20 wt. %, for example less than 10 wt. %. The binder content is typically in the range of 0.1-20 wt. %, for example 0.1-10 wt. %, optionally 1-10 wt. %.

For batteries, electrode materials are needed with the possibility to intercalate/de-intercalate ions. Typically, the content of the active materials in 30-80 wt. %, for example 40-70 wt. %. However, active electrode materials for batteries, for example metal oxides, sulfides, hexacyanoferrates, sulfur, silicon, have poor electrical conductivity. In order for the electrodes being electroconductive, corresponding additives have to be supplied to the mix, for example carbon blacks, carbon fibers, nanotubes, graphite, and amorphous carbons. Possible are also electroconductive polymers. The concentration of additives is typically 20-70 wt. %, for example 30-60 wt. %. The content of binder is typically in the range of 0.1-20 wt. %, for example 1-10 wt. %.

For fuel cells, electrodes comprise metals from the chemical noble metal group as active material, for example Pt. Typically, the content of such active material is in the range of 5-75 wt. %, for example 10-70 wt. %. Platinum, however, is a high-cost material, which is why, typically, the content is in the lower end of the stated range, for example in the range of 5-30 wt. % or 10-30 wt. %, and an electroconductive additive is used in the mix, for example carbon blacks, carbon fibers, nanotubes, graphite, and amorphous carbons, which reduces the overall production costs and also increases the Pt utilization. Such content of electroconductive material is typically in the range of 10-50%. Additionally, additives can be used for increased mechanical stability. The relative amount of the binder material is typically in the range of 1-30 wt. %, for example 5-20 wt. %.

For example, the electrode is used for a high temperature polymer electrolyte membrane fuel cell, (HT-PEM), which operates above 120° C., differentiating HT-PEM fuel cell from low temperature PEM fuel cells, the latter operating at temperatures below 100° C., for example at 70° C. The normal operating temperature of HT-PEM fuel cells is the range of 120° ° C. to 200° C., for example in the range of 160° C. to 170° C. Such HT-PEM fuel cells are advantageous for compact fuel cell systems, for example for automobile industry.

SHORT DESCRIPTION OF THE DRAWINGS

The invention is explained in more detail with reference to the drawings, wherein.

DETAILED DESCRIPTION/PREFERRED EMBODIMENT

Fast and uniform dispersion of powders by using water as a liquid phase involves a significant simplification relatively to dry methods for manufacturing self-supporting electrode films. Despite being a wet process, it is environmentally friendly, as there are no organic solvents used in the process.

PTFE is taken as an example for a binder in the electrode manufacturing process without organic solvents. But the other thermoplastic polymers from Table 1 can be also used as alternative binding agents. The list is not necessarily exclusive, but fluoropolymers have proven useful.

As explained in the following, the powder is dispersed in an aqueous liquid to form a suspension of particles. Typically, the aqueous liquid is water. However, although the aqueous liquid is based on water as the main component, the aqueous liquid may also contain small amounts of liquid additives or dissolved additives, such as surfactants, dissolved salts, or other additives that are beneficial for the process. Such additives may be dissolved in the water prior to mixing with the powder in order to obtain the dispersion, or such additives may be added to the dispersion, changing the water in the dispersion to an aqueous liquid.

In any case, characteristic for the aqueous liquid in the process as explained herein is the fact that it does not contain organic solvents. Thus, in the process, no alcohols are used and neither acetone or other organic solvents. Accordingly, the process is environmentally friendly, and does not imply a health hazard which is otherwise caused when using organic solvents.

Although, the person of ordinary skill understands the above terminology, we give the following explanation here for completeness. In the following, for simplicity when describing the process, we will use the term "water" for the aqueous liquid in the dispersion, although, it is implicated that the water may contain additives, for example a surfactant, but, normally, its content is below 10 wt. %.

Figure 1:
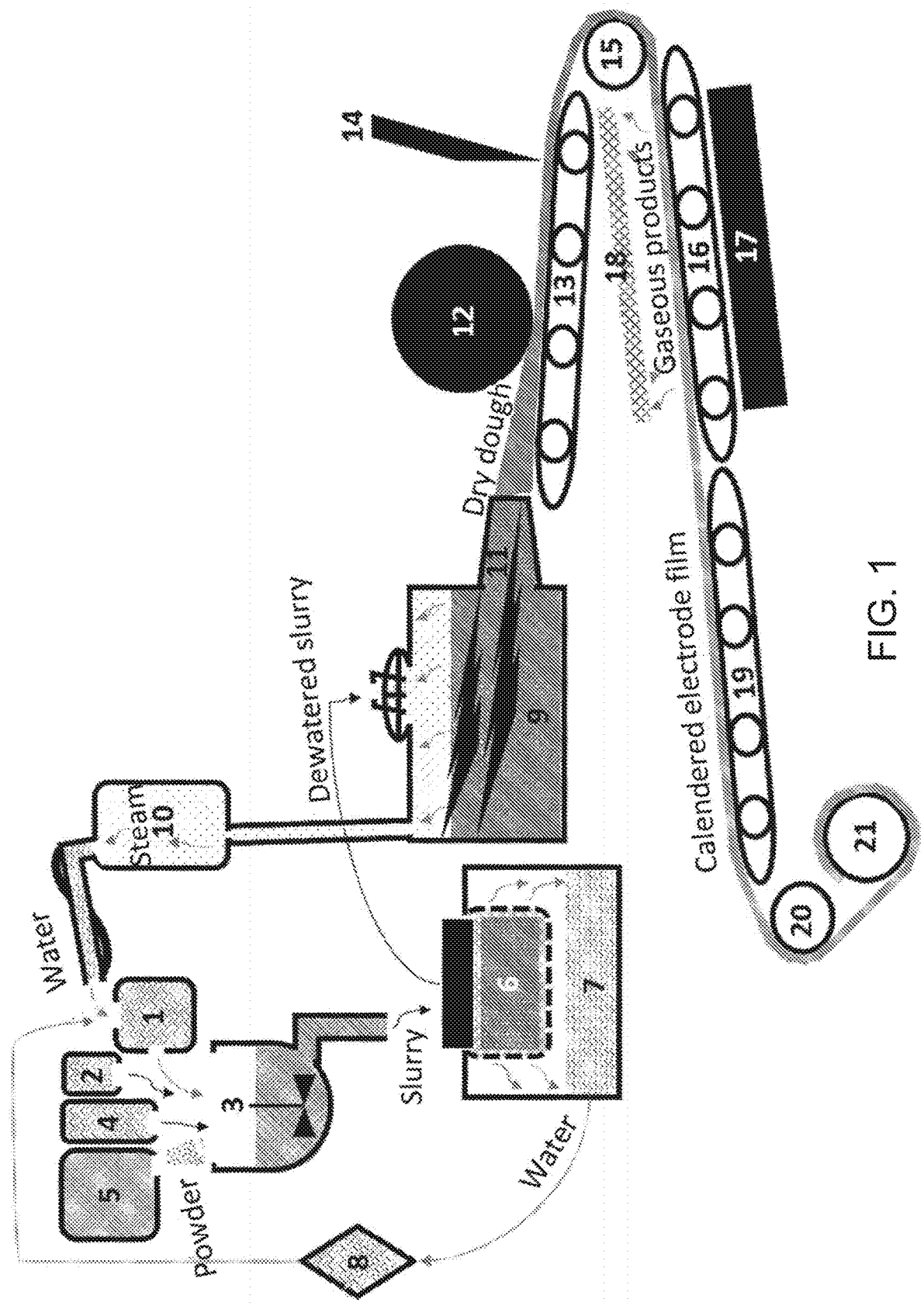
FIG. 1 is a principle flow scheme of a continuous process for production of self-supported electrode film.

The stages of the process are generally described by the scheme in FIG. 1.

Water (or aqueous liquid as per the discussion above) is supplied from a liquid supply container 1 to a dispersion container 3 and mixed with a binder material, for example a PTFE binder, from binder container 2 to achieve an aqueous binder dispersion in a dispersion container 3. In terms of weight percentages relatively to the total weight of dry material in the dispersion, the amount of binder, for example PTFE, is typically in the range 0.1-30 wt. %, for example 0.1-10 wt. %, optionally 1-10 wt. %, thus typically less than 20 wt. %.

A typical time for dispersion of the binder by stirring in the dispersion container 3 is in the order of 1-5 minutes. However, alternatively or additionally, other mechanisms can be used to obtain a suspension/dispersion, for example ultrasound.

An active material in powder form is added from container 5 to the dispersion container 3.

Furthermore, one or more additives may be added in powder form from one or more additive containers 4. The illustrated single additive container 4 is stylistic in that is symbolizes the general addition of powder additives, although for several additives, in reality, typically, a corresponding number of additive containers 4 would be provided.

An example of a powder additives is an electroconductive material in powder form. Although, in some cases, the active material powder is a type of material that yields electrical conductivity, this need not be the case, which is why in the latter case an electroconductive additive is supplemented to the dispersion in dispersion container 3 from a corresponding additive container 4 in order to yield an electroconductive electrode material mix.

Another example of an additive that can be added from an additive container 4 to the dispersion in the dispersion container 3 is a powder of a pore-forming agent in order to develop a predetermined degree of porosity of the final electrodes. For example, the pore-forming agent is a sacrificial polymer which during the late stage in the production is heated above its decomposition temperature, causing its complete decomposition into gaseous products, leaving voids in the materiel instead of the powder of the pore-forming agent.

The concentration and grain size of the powder of the sacrificial polymer is adjusted for the desired concentration of pores in the end product as well as the size of the voids. Typically, the pore-forming agent is added in quantities in the range of 0-50 wt. %, but normally 10-20 wt. %.

Optionally, the pore-forming agent is pre-dispersed in water in the additive container 4, for example by stirring for 1-5 minutes.

In order to be satisfactory as a pore-forming agent, the sacrificial polymer must be carefully selected relatively to the binder material. The sacrificial polymer agent should decompose at temperatures above the boiling point of water and above the glass transition temperature of the binder polymer, which for PTFE is 110° C., as the decomposition otherwise would occur too early in the process. On the other hand, the decomposition temperature must be below the melting point of the binder polymer, which is 327° C. in case of PTFE, as the binder polymer should not be melted.

A possible candidate as pore-forming agent is polypropylene carbonate (PPC), having a decomposition temperature of 250° C. It is provided in powder form, and mixed with the other powder in the aqueous dispersion. As an example, an aqueous emulsion of polypropylene carbonate (PPC), for example commercially available as QPAC®40 from Empower Materials [Ref. 49], may be taken as pore forming agent. Optionally, the pore-forming agent is added from additive container 4 prior to adding an active agent.

Useful candidates as sacrificial binder are also found among other poly(alkylene) carbonates, such as polybutylene carbonate (PBC), polycyclohexene carbonate (PCHC) and polyethylene carbonate (PEC) [Ref. 50]. These have decomposition temperatures in the range of 220° C.-275° C.

Other additives can be added depending on the purpose, for example for increasing mechanical stability. For example, the active material comprises carbon fibers and potentially graphene for providing increased mechanical stability and flexibility. A large variety of materials are possible, some primarily used for increasing conductivity, others primarily for increasing mechanical stability.

All powders and potential additives, are mixed in dispersion container 3, including the binder, an optional electro-conductive additive, an optional pore forming agent as well as other potential additives, including surfactants.

When powder additives are mixed into the dispersion, typically, the amount of active material is in the range of 1-80 wt. %, but more often 10-50 wt. % or even 30-40 wt. % of the weight of the total dry powder material.

Optionally, the solid content in the slurry formed in the dispersion container 3 is in the range of 10-80 wt. %, typically 30-50 wt. %, of the total mass of the dispersion, the latter percentage being beneficial to obtain a uniform particle distribution.

After mixing of the ingredients in dispersion container 3, the resulting slurry is moved to a dewatering container 6. For example, the dewatering container 6 is provided with sieves allowing to filter solids from water, which is also sometimes called phase separation in the relevant technical field. For example, this can be done by applying pressure on the dispersion with the sieve, so that the liquid is pressed through the sieve and can then be removed from the dewatering container 6, for example into drain container 7.

Optionally, the liquid from dispersion container 3, such as water with or without additives, is recycled back to liquid supply container 1, typically after filtering of the liquid in a recycling filter 8.

The dewatered slurry is transferred from the dewatering container 6 to a kneading stage with a heated kneader 9 for kneading and drying. For example, the kneader is a Z- or Sigma-type blade mixer and kneader. This process is performed at elevated temperatures above the boiling point of water so that the remaining water evaporates. Optionally, water vapor from the kneader 9 is collected in condenser 10 where it becomes liquid again for return to water supply container 1.

Optionally, the temperature for the evaporation from the kneader 9 is adjusted such that potentially also other liquid additives evaporate. However, this depends on the process preferences.

Optionally, an inert gas atmosphere may be used to avoid oxidation of active material and/or vacuum to reduce drying time and/or drying temperature.

The time for evaporating the liquid takes less than an hour, and a typical evaporation time is in the range of 10-60 minutes, optionally in the range of 10-45 mins, for example in the range of 10-25 mins.

After evaporation of liquid, the kneading of the dried mix in the kneader 9 at elevated temperatures above the glass transition temperature of the binder material results in the dried mixture obtaining plasticity and elasticity and becoming malleable, similar to a dough for bread. In this kneading process, an advantageous effect is obtained by fibrillization of the binder material, for example PTFE. For PTFE, this is only possible at a temperature above its glass transition temperature, i.e. above 110° C. for PTFE, or rather a few degrees above the glass transition temperature, for example at a temperature above 116° C. for PTFE, due to the fact that PTFE is still in quasi-rigid amorphous state at 110° C. However, for fibrillization of the binder, the temperature must be below the melting temperature, which is 327° C. for PTFE, typically however substantially below that temperature.

For example, if a pore-forming agent used in the electrode production process, an upper temperature limit for the kneading is set by the decomposition temperature of the pore-forming agent, for example 180° C. in case of polypropylene carbonate [Ref. 54]. Applying a temperature close to this upper limit during the kneading can be useful due to the ability of PTFE to increase its tensile elongation continuously with increasing temperature [Ref. 55].

The time length of the kneading process in the kneader 9 under dried condition depends mainly on the efficiency of the kneader 9, the type of binder material, the relative amount of the binder material, and the temperature. Typically, in order to obtain a good degree of fibrillization of the binder, for example PTFE, the time for kneading the dried mix is in the range of 1-15 minutes, for example in the range of 3-15 mins, after the water (or aqueous liquid) has evaporated.

After sufficient kneading, the malleable dry mix, is extruded from the kneader 9 via die 11, where it is shaped, for example into a slab or a film. In some embodiments, the dry mix is extruded in discrete portions, and the portions are transported one after the other through the following stations.

Alternatively, and very useful for large scale production, the slab or film is extruded as a quasi-endless and can potentially be rolled onto a roller at the end of the process, which is advantageous.

The term "quasi-endless" is used herein for a long strip, which during the process appears as not ending, although the strip has a beginning and, after stopping the extrusion, also an end. In the technical field, the term "endless" is sometimes used instead of "quasi-endless".

The extruded dry mix is moved to a calendering station 12 by calender conveyor 13 in order for the film becoming pressed into a specified thickness. The thickness of the film can be varied in a wide range, but normally it is in the range of 10-1000 μm, for example 30-300 μm. The number of calendering stations is adapted such that a desired final thickness and density of the electrode film is achieved. Such parameters are extremely important for electrodes used in electrochemical energy conversion and storage devices [Ref. 56]. For example, bulk densities for the activated carbon-based electrode film after its calendering are within range 0.3-1.5 g/cm$^3$, but more often between 0.5 and 1.0 g/cm$^3$ or even from 0.6 to 0.8 g/cm$^3$. An electrode film that contains other active materials will have other range of bulk density, defined not only by the pore structure of the electrode but also by the skeletal density of raw active material and its content in the electrode composition.

Typically, the calendering time is in the range of 0-1 minutes, optionally 2-5 minutes.

Typically, the calendered film is provided with smooth edges along the side of the quasi endless strip by means of an edge cutter 14.

The film is moved as a continuous strip in a continuous process via guide roller 15 and transport conveyor 16 to a cooling station 19, for example in a continuous process while moving on a cooling conveyor.

Optionally, the transport conveyor 16 passes by a further heating station 17, for example if the mix contains a pore-forming agent which needs decomposition in order to provide voids in the material to achieve a porous electrode. In this case, the temperature here is defined by the decomposition temperature of the sacrificial additive. In case of polypropylene carbonate, it is at least 180° C., although a higher temperature is better, for example above 240° C. [Ref. 54]. However, the temperature should be lower than the melting point of the binder material, in order to avoid sticking of the electrode film to the heating conveyer 16 and in order to avoid damage of the achieved voids and the fibrillization. Gaseous products that leave the mix are potentially caught by means of a fume trap 18.

Subsequently, the film is cooled down, for example to ambient temperature, in the cooling station 19. The cooling time is typically in the range of 5-10 mins Optionally, roller 20 is used to guide the electrode film onto a film collection roller 21 where it is collected for storage and/or for further assembly with other components.

Combination of electrodes with other components as part of the final stage before mounting in the device, is optionally done after cutting the film into suitably-sized pieces. Examples of such components are current collectors, for example metal current collectors, carbon cloth- or carbon paper-based gas-diffusion layers, porous polymer or paper separators, or ion-exchange membranes. The final use depends on the type of the electrochemical energy conversion and storage device in which the electrode film is to be used.

Typical time frames for the production from the mixing stage until the rolling of the produced sheet onto a storage or transport roller 21 are in the order of 20-60 minutes. This includes the mixing time, the evaporation time, the kneading time above the glass transition temperature of the binder for obtaining fibrillization, and the time for extrusion and calendering as well as cooling time. This is suitable for a continuous process and advantageous relatively to the prior art, where two hours are used just for drying.

Figure 3:
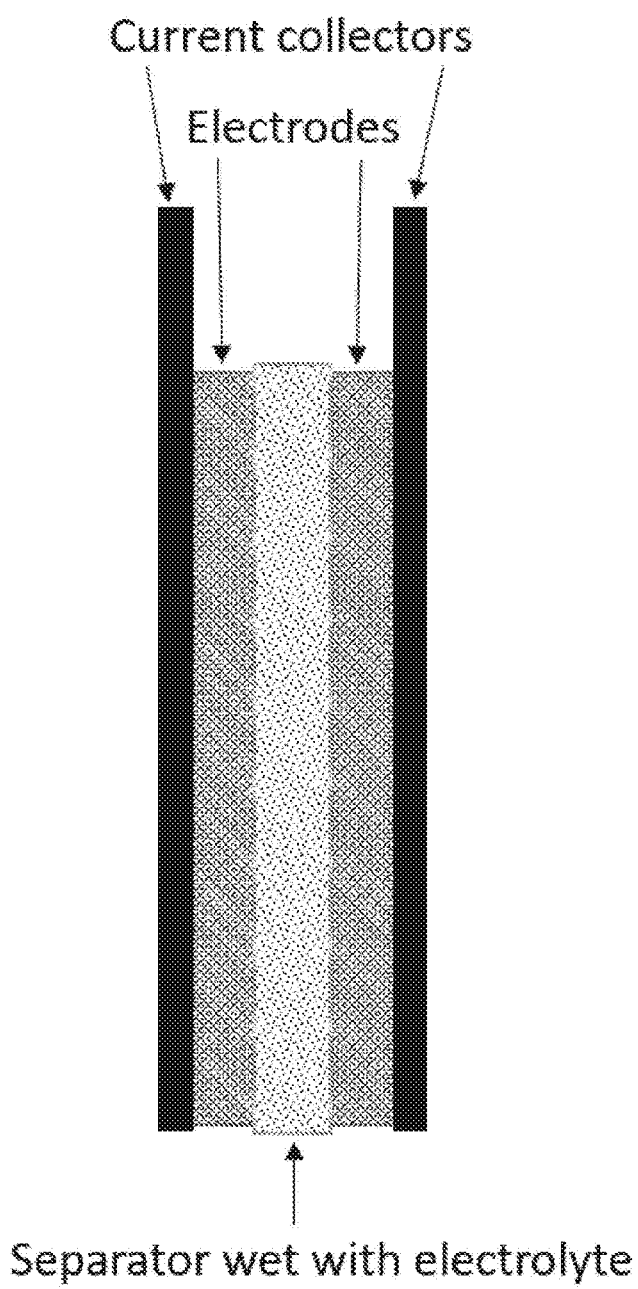
FIG. 3 illustrates an arrangement with current collectors, electrodes and separator.

In some practical experiments, an electric double-layer capacitor was assembled with activated carbon-based electrodes (AC-EDLCs) that were produced by the organic solvent-free method with an aqueous electrolyte solution, as described above. The electrodes contained activated carbon (99.5 wt. %) and PTFE (0.5 wt. %) and were wetted by a 1M LiCl aqueous solution. The double layer capacitor was constructed simple with parallel stainless-steel current collectors, used as a backings for the two parallel electrodes, and a paper separator in between, which was permeable for ions of the used electrolyte solution. The principle of the capacitor is illustrated in FIG. 3.

Figure 2:
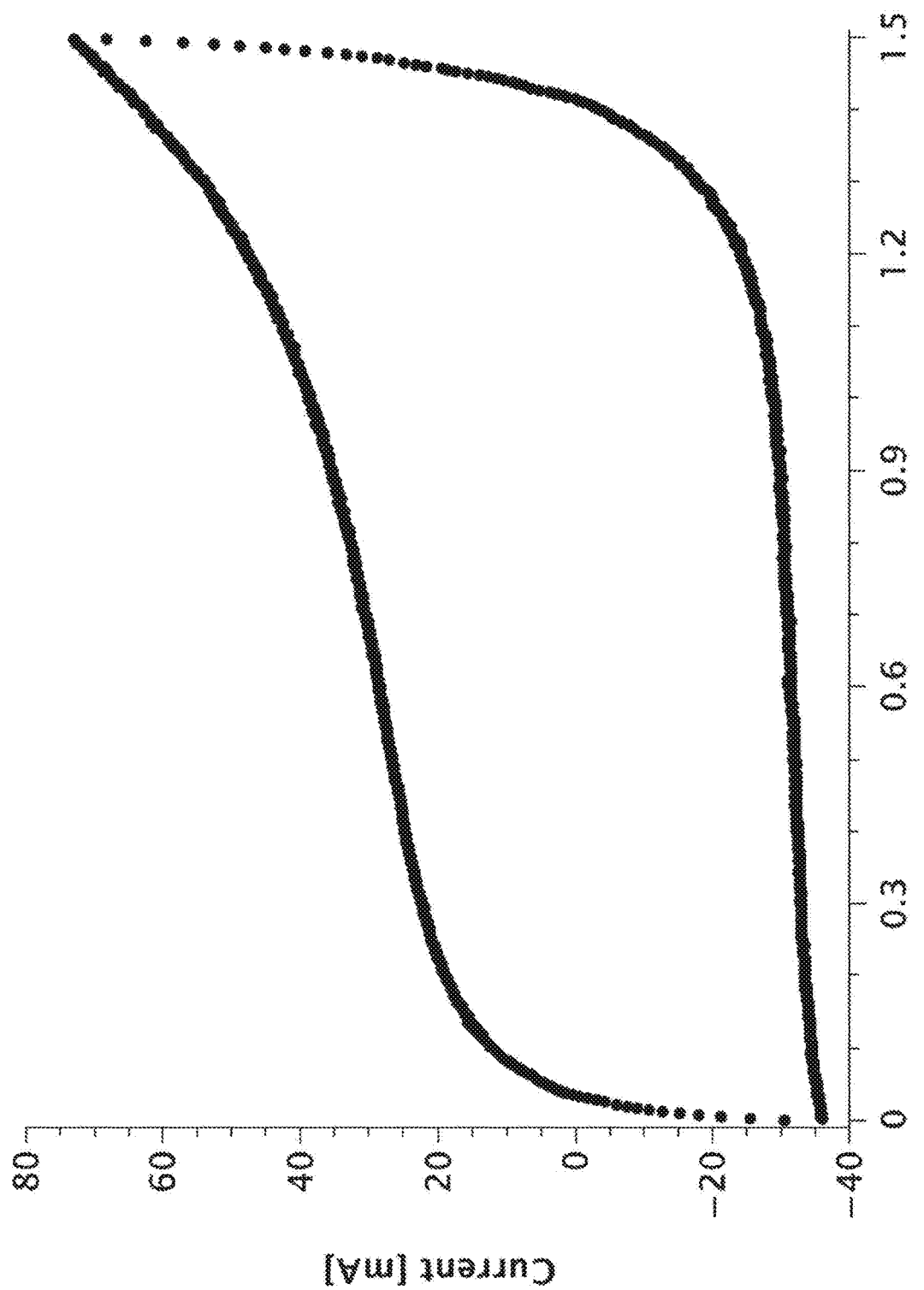
FIG. 2 is a cyclic voltametric curve for an AC-EDLC produced by a method as presented.

This double layer capacitor demonstrated an electrochemical behavior that is typical for this types of device. The cyclic voltametric curve, shown in FIG. 2 is almost rectangular up to 1 V with insignificant increase of charged current, which indicates electric double layer formation, i.e. storage of energy occurs electrostatically, while further sharp grow of current is related to faradaic process in the system, namely water decomposition [Ref. 57]

Moreover, calculated gravimetric capacitance for experimentally produced AC-EDLC exceeds 24 F/g, which is a comparable result relatively to literature sources for similar devices, as indicated in Table 2.

TABLE 2

Comparison of gravimetric capacitance for some electric double-layer capacitors with activated carbon electrodes

| AC-EDLC | Gravimetric capacitance [F/g] |
| --- | --- |
| This work | 24.04 |
| [Ref. 58] | 22-26 |
| [Ref. 59] | 13-30 |
| [Ref. 60] | 25-30 |

It should be mentioned here that the active material utilized in the self-supporting electrode film produced as described above by the organic solvent-free process and tested in AC-EDLC is powder of activated carbon, commercially available as product YP-50F from Kuraray Chemical [Ref. 61]. Other devices presented in Table 2 contain electrodes based on commercially available activated carbons as well.

In summary, advantages of the process that was described for electrode production include:

1) possibility to produce self-supporting electrode film without using harmful and/or flammable organic solvents
2) no strict requirement to the mixing stage of the process, namely it can be made at ambient temperature and pressure conditions;
3) relatively fast drying procedure due to the use of stage with phase separation;
4) content of binding agent can be reduced to 0.1 wt. % for some applications and generally to 0.5 wt. %;
5) variation of density and porosity for electrode film via adding/removing rolling stations and pore forming agents;
6) useful as a continuous process for fast large-scale production.

REFERENCE NUMBERS FOR FIG. 1

1 liquid supply container
2 binder container
3 dispersion container
4 additive container
5 active-agent container
6 dewatering container
7 drain container
8 filter for recycling of water
9 kneader
10 condenser for steam
11 die
12 calendering station
13 calender conveyor
14 edge cutter
15 guide roller
16 conveyor
17 heating station
18 fume trap
19 cooling station with cooling conveyor
20 roller
21 collection roller

LITERATURE REFERENCES

[1] Badwal S P S, Giddey S S, Munnings C, Bhatt A I, Hollenkamp A F. Emerging electrochemical energy conversion and storage technologies. Frontiers in Chemistry, 2, 2014, 1
[2] Stevenson A J, Gromadskyi D G, Hu D, Chae J, Guan L, Yu L, Chen G Z. Supercapatteries with hybrids of redox active polymers and nanostructured carbons. Nanocarbons for Advanced Energy Storage, 6, 2015, 179
[3] Gromadskyi D G, Hydrothermal express synthesis of $CNT/MnO_2$ composite for asymmetric supercapacitor. Surface Engineering and Applied Electrochemistry, 52, 2016, 289
[4] Colón-Mercado H R, Popov B N. Stability of platinum based alloy cathode catalysts in PEM fuel cells. Journal of Power Sources, 155, 2006, 53
[5] Chen Z, Higgins D, Yu A, Zhang L, Zhang J. A review on non-precious metal electrocatalysts for PEM fuel cells. Energy and Environmental Science, 4, 2011, 3167
[6] Gromadskyi D, Chervoniuk V, Kirillov S. Cyclic voltametric study of tin hexacyanoferrate for aqueous battery applications. Journal of Electrochemical Science and Engineering, 6, 2016, 225
[7] Buqa H, Holzapfel M, Krumeich A, Veit C, Novak P. Study of styrene butadiene rubber and sodium methyl cellulose as binder for negative electrodes in lithium ion batteries. Journal of Power Sources, 161, 2006, 617
[8] Wang F, Li X. Effects on the electrode wettability on the deep discharge capacity of Li—$O_2$ batteries. ACS Omega, 3, 2018, 6006
[9] Ludwig B, Zheng Z, Shou W, Wan Y, Pan H. Solvent free manufacturing of electrodes for lithium-ion batteries. Scientific Reports, 6, 2016, 23150
[10] Lee W J, Lee J S, Park H Y, Park H S, Lee S Y, Song K H, Kim H J. Improvement of fuel cell performances through the enhanced dispersion of the PTFE binder in electrodes for use in high temperature polymer electrolyte membrane fuel cells. International Journal of Hydrogen Energy. In press, 2020
[11] Amin-Sanayei R, Pomante J, He W. Solvent-free electrode fabrication. U.S. Pat. No. 10,707,492 B2
[12] Toigo C, Arbizzani C, Pettinger K H, Biso M. Study of different water-based binders for $Li_4Ti_5O_{12}$ electrodes. Molecules, 25, 2020, 2443
[13] Spreafico M A, Cojocaru P, Magagnin L, Triulzi F, Apostolo M. PVDF latex as a binder for positive electrodes in lithium ion batteries. Industrial and Engineering Chemistry Research, 53, 2014, 9094
[14] https://www.nevicolor.it/prodotti/ricerca-polimero/solvay/solef-pvdf/docu-menti/solef-pvdf-aqueous-dispersions-for-lithium-batteries-en.pdf
[15] https://www.sigmaaldrich.com/catalog/product/aldrich/665800?lang=en&region=DK&gclid=Cj0KCQjw8rT8BRCbARIsALWiOvTf-NXa1Z9BZOO0tusViAt7c7PwlFrfSE8UxVfG0Is61JsJKzeedkAaAsDwEALw_wcB
[16] http://laurelproducts.com/ptfe-aqueous-dispersion/
[17] https://www.teflon.com/en/products/dispersions
[18] https://www.inoflon.com/pdf/Aq %20PTFE_MSDS.pdf
[19] https://www.imcdus.com/ptfe-dispersions/
[20] https://fluorogistx.com/products/teflon-dispersion-ptfe/

[21] http://www.matweb.com/search/datasheettext.aspx?matguid=f69b869c16494004b96c827e0d736590
[22] https://www.chinafluoropolymer.com/ptfe/ptfe-aqueous-dispersion/ptfe-aqueous-dispersion-coating.html
[23] http://download.ceris.purdue.edu/file/3187
[24] https://www.guarniflon.com/en/ptfe-standard-compound-menu-en/60-eng-lish/guarniflon-s-p-a-en/products/tenfil-en
[25] http://www.bainaisi.com/en/item/?id=164
[26] http://www.haiflon.com/ptfe-aqueous-dispersion
[27] https://shamrocktechnologies.com/product/aquaflon-60/
[28] Mitchell P, Xi X, Zhong L, Zou B. Dry particle based adhesive electrode and method of making same. U.S. Pat. No. 7,295,423 B1
[29] Cheng Y T, Odom S A, Al-Shroofy M N, Saito K, Zhang Q, Xu J. Solvent-free dry powder-coating method for electrode fabrication. U S patent application No 2017/0098818 A1
[30] Ashraf M A, Peng W, Zare Y, Rhee K Y. Effects of size ang aggregation/agglomeration of nanoparticles on the interfacial/interphase properties and tensile strength of polymer nanocomposites. Nanoscale Research Letters, 13, 2018, 214
[31] Zare Y. Study of nanoparticles aggregation/agglomeration in polymer particulate nanocomposites by mechanical properties. Composites A, 84, 2016, 158
[32] Hartley P A, Parfitt G D, Pollack L B. The role of the van der Waals force in the agglomeration of powders containing submicron particles. Powder Technology, 42, 1985, 35
[33] Wang M, Chen G, Zhamu A, Jang B Z. Solvent-free based graphene electrode for energy storage devices. US patent application No. 2014/0030590 A1
[34] https://www.substech.com/dokuwiki/doku.php?id=ethylene_chlorotrifluoro-ethylene_ectfe
[35] http://www.matweb.com/search/datasheet_print.aspx?matguid=65edaac69a994a9d8blecl aeace0acdf
[36] https://www.agc-chemicals.com/file.jsp?id=cn/en/fluorine/products/fluon/download/pdf/FluonLM-ETFE_ENG.pdf
[37] https://www.substech.com/dokuwiki/doku.php?id=ethylene_tetrafluoroethylene_etfe
[38] http://www.row-inc.com/pdf/FEP_Property_Chart.pdf
[39] https://www.zeusinc.com/wp-content/uploads/2020/06/FEP-Material-V2R2.pdf
[40] Greer A I M, Vasiev I, Della-Rosa B, Gadegaard N. Fluorinated ethylene-propylene: a complimentary alternative to PDMS for nanoimprint steps. Nanotech-nology, 27, 2016, 155301
[41] http://sterlingplasticsinc.com/materials/pctfe-polychlorotrifluoroethylene/
[42] https://polymerdatabase.com/polymers/Polychlorotrifluoroethylene.html
[43] Zulfiqar S, Zulfiqar M, Rizvi M, Munir A. Polymer degradation and stability, 43, 1994, 423
[44] https://www.swmintl.com/media/2342/pctfe-spec-sheet-63005-new.pdf
[45] http://hep.ucsb.edu/LZ/ptfe_handbook.pdf
[46] http://www.matweb.com/search/datasheet_print.aspx?matguid=ef394cle30c54ca8b21836 006aee2484
[47] Hondred P R, Yoon S, Bowler N, Kessler M R. Degradation kinetics of polytetrafluoroethylene and poly(ethylene-alt-tetrafluoroethylene). High Performance Polymers, 25, 2013, 535
[48] Tobolsky A V, Katz D, Takanashi M. Rheology of polytetrafluoroethylene. Journal of Polymer Science A, 1, 1963, 483
[49] https://empowermaterials.com/products/qpac-40
[50] https://empowermaterials.com/products
[51] Gogotsi Y, Anasori B. The rise of MXenes. ACS Nano, 13, 2019, 8491
[52] Li W J, Chan C, Cheng G, Chou S L, Liu H K, Dou S H. Chemical properties, structural properties, and energy storage applications of Prussian blue analogues. Small, 2019, 1900470
[53] Calleja G, Jourdan A, Ameduri B, Habas J P. Where is the glass transition temperature of poly(tetrafluoroethylene)? A new approach by dynamic rheometry and mechanical tests. European Polymer Journal, 49, 2013, 2214
[54] Phillips O, Schwartz J M, Kohl P A. Thermal decomposition of poly(propylene carbonate): End-capping, additives, and solvent effects. Polymer Degradation and Stability, 125, 2016, 129
[55] http://dictkr.com/down/Fluon%20ETFE%20Technical%20Bulletin.pdf
[56] Gromadskyi D G, Hromadska Li. Bivariant mechanical tuning of porous carbon electrodes for high-power and high-energy supercapacitors. Surface Engineering and Applied Electrochemistry, 52, 2016, 584
[57] Frackowiak E, Beguin F. Carbon materials for the electrochemical storage of energy in capacitors. Carbon, 39, 2001, 937
[58] Gromadskyi D G, Chae J H, Norman S A, Chen G Z. Correlation of energy storage performance of supercapacitor with iso-propanol improved wettability of aqueous electrolyte on activated carbon electrodes of various apparent densities. Applied Energy, 159, 2015, 39
[59] http://www.gecarbon.org/boletines/articulos/boletinGEC_028-A4.pdf
[60] Obreja V, Dinescu A, Obreja A S. Activated carbon based electrodes in commercial supercapacitors and their performance. International Review of Electrical Engineering, 5, 2010, 272
[61] http://www.scmbattery.com/en/product_show.php?id=107
[62] Zhijia Du, Claus Daniel, Jianlin Li, David L. Wood, Manufacturing of thick composite electrode using solvent mixtures, U.S. Pat. No. 10,601,027.
[63] Hiroyuki Yoshimoto, Shinichi Chaen, Kazuya Kawahara, Yoshiyuki Shibuya, Masamichi Sukegawa. Sheet, electrode and fuel cell. European patent application EP2871697A1.
[64] Duncan, Renee Kelly; Zimmermann, James William. carbon electrode batch materials and methods of using the same. US2011204284 A1.
[65] Tarasov, Sergey Vladimorovich; Menukhov, V.; Varakin, Igor Nikolaevich. Method of manufacturing polarizable electrodes for use in electrochemical capacitors. US2013300019A1.
[66] Marc Andelmann. Strengthened conductive polymer stabilized electrode composition and method of preparing. U.S. Pat. No. 6,127,474.
[67] Jabbour, Lara; Chaussy, Didier; Beneventi, Davide; Destro, Matteo; Bodoardo, Silvia; Gerbaldi, Claudio; Penazzi, Nerino. Method for preparing self-supporting flexible electrodes. US2014255782A1.
[68] Enokihara Katsushi, Method for producing electrode paste. US2015251109A1.

[69] Wakizaka Yasuhiro and Yabuuchi Yosuke. Binder Composition for secondary battery electrode and method for producing the same. US2011171526A1.

The invention claimed is:

1. A method of producing a self-supported electrode film for an electrode in a group of devices for electrochemical energy conversion or devices for electrical energy storage, the group including batteries, electric double layer capacitors, supercapacitors and supercabatteries, fuel cells, and electrolyzers; wherein the method is free from organic solvents, wherein the method is automatic and comprises processes in an automated sequence, the processes comprising,
- in a mixing process, providing an aqueous dispersion of a powder mix in an aqueous liquid, the powder mix comprising a content of a first powder, which is a powder of a binder material, and a content of a second powder, which is a powder of an active material for the electrode, wherein the binder material is a polymer with fibrilization capabilities and the binder material has a glass transition temperature and a melting temperature;
- in a separation process after dispersion of the powder mix, separating the powder mix from a portion of the aqueous liquid in the dispersion by a mechanical process for obtaining a liquid-reduced slurry of the powder mix of binder material and active material,
- in an evaporation process, after the separation process, heating the powder mix to a boiling point of the aqueous liquid and causing evaporation of remaining liquid from the dispersion to form a mixture of the binder material and the active material;
- in a kneading process, kneading the mixture in a kneader after evaporation of the aqueous liquid at a temperature above the glass transition temperature of the binder material but below the melting temperature of the binder material for transforming the mixture into a malleable substance by the kneading, and continuing to knead the mixture until fibrillization of the binder material is caused by the kneading;
- after the kneading process, in an extrusion process, extruding the malleable substance, and in a calendering process, calendering the extruded malleable substance by calendering rollers into a film with a predetermined thickness of 10-1000 micrometers, wherein the malleable substance after the kneading process has a temperature that is only below the melting temperature of the binder material for maintaining the fibrillization of the binder material;
- in a cooling stage, cooling the electrode film to a temperature below the glass transition temperature of the binder material.

2. The method according to claim 1, wherein the method comprises, after the separation process, moving the powder mix into the kneader and performing the evaporation process in the kneader during the kneading.

3. The method according to claim 1, wherein the separation process comprises using sieves having pores that retain the powder mix but let the aqueous liquid from the dispersion flow through the pores.

4. The method according to claim 1, wherein the binder material is a fluoropolymer with fibrilization capabilities, wherein the glass transition temperature is at least 80° C., the melting temperature is above 200° C., and the binder material has an elongation at break of at least 150%.

5. The method according to claim 1, wherein the method comprises providing the dispersion with 0.1-30 wt. % of the first powder and 1-99.9 wt. % of the second powder, a sum of which is equal to or less than 100 wt. %, and wherein weight percentages of the first powder and the second powder are measured relative to a total weight of dry material in the dispersion.

6. The method according to claim 1, wherein, if the active material is not electroconductive, the binder material comprises an electroconductive polymer, or the powder mix comprises an electroconductive third powder for providing electroconductivity to the electrode.

7. The method according to claim 1, wherein the content of the first powder is less than 20 wt. % relative to a total weight of dry material in the dispersion.

8. The method according to claim 1, wherein the method comprises
- adjusting a mixing time to 1-5 minutes for the mixing process,
- adjusting an evaporation time to 10-25 minutes for the evaporation process,
- adjusting a kneading time to 1-15 minutes for the kneading process after the evaporation,
- adjusting a calendering time to 2-5 minutes for the calendering process,
- adjusting a cooling time to 5-10 minutes after the kneading process,
- adjusting a total time to 20-60 minutes for a continuous production process comprising the processes in the automated sequence.

9. The method according to claim 1, wherein the method comprises performing a kneading test-trial prior to implementing the kneading in an automated production process, wherein the method comprises a test-trial that comprises measuring, as a function of kneading time and kneading temperature, at least one physical property of the electrode film, wherein the physical property is at least one of
- degree of fibrillization of the binder material,
- tensile strength of the electrode film,
- tensile strength of the electrode that comprises the electrode film,
- elongation at break of the electrode film,
- elongation at break of the electrode that comprises the electrode film,
- and wherein the method comprises adjusting the kneading temperature and the kneading in the kneading stage for a continuous production process based on the test-trial for obtaining a level of the physical property above a predetermined level.

10. The method according to claim 1, wherein the method comprises providing the electrode film as a quasi-endless strip and rolling the strip into a roll for at least one of storage and transport.

11. The method according to claim 10, wherein the method comprises unrolling the strip from the roll and cutting the strip into pieces and mounting the pieces to a current collector for providing a combination of the electrode and the current collector, and installing the combination in at least one of the devices.

12. The method according to claim 1, where the method comprises
- prior to the mixing process, selecting a pore forming agent relative to a selection of the binder material, wherein the pore-forming agent is selected from among sacrificial polymers that decompose into gaseous products at a decomposition temperature above a boiling point of water and above the glass transition temperature of the binder material but below the melting temperature of the binder material, predetermining a pore size for pores in a final product, providing powder of the pore-forming agent with a grain size corresponding to the predetermined pore size, in the mixing process, adding the powder of the pore-forming agent to the dispersion, only after the calendering process, in a pore-forming process as part of the automated sequence, heating the electrode film to a temperature of or above the decomposition temperature of the pore-forming agent but below the melting temperature of the binder material for providing pores in the electrode film by a decomposition and vaporization of the pore-forming agent.

13. The method according to claim 1, wherein the method comprises, predetermining whether the electrode film is to be used for electrodes in electric double layer capacitors, and if so, adjusting the content of the first powder of the binder material to 1-10 wt. % of a total weight of dry material in the dispersion and the content of the second powder of the active material to 80-90 wt. % of the total weight of dry material in the dispersion, wherein the second powder contains predominantly carbon powder.

14. The method according to claim 1, wherein the method comprises, predetermining whether the electrode film is to be used for electrodes in the batteries, and if so, adjusting the content of the first powder of the binder material to 1-10 wt. % of a total weight of dry material in the dispersion and the content of the second powder of the active material to 30-60 wt. % of the total weight of dry material in the dispersion, and adding electroconductive additive material as a third powder in an amount of 10-70 wt. % of the total weight of dry material in the dispersion into the dispersion for providing electroconductivity in the electrode film, wherein the third powder contains predominantly carbon powder.

15. The method according to claim 1, wherein the method comprises, predetermining whether the electrode film is to be used for electrodes in the fuel cells, and if so, adjusting the content of the first powder of the binder material to 5-20 wt. % of a total weight of dry material in the dispersion and the content of the second powder of the active material to 10-70 wt. % of the total weight of dry material in the dispersion, and adding electroconductive additive material as a third powder in an amount of 10-70 wt. % of the total weight of dry material in the dispersion into the dispersion, wherein the third powder contains predominantly carbon powder.

* * * * *